United States Patent
Chang et al.

(10) Patent No.: US 9,334,418 B2
(45) Date of Patent: May 10, 2016

(54) STAIN-RESISTANT FLUOROCHEMICAL COMPOSITIONS

(75) Inventors: Cheng-Chung Chang, New Brighton, MN (US); Zai-Ming Qiu, Woodbury, MN (US); Naiyong Jing, Woodbury, MN (US); Cheryl L Elsbernd, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 2253 days.

(21) Appl. No.: 11/321,680

(22) Filed: Dec. 29, 2005

(65) Prior Publication Data

US 2008/0008888 A1   Jan. 10, 2008

Related U.S. Application Data

(60) Provisional application No. 60/640,471, filed on Dec. 30, 2004.

(51) Int. Cl.
 *C08F 214/18* (2006.01)
 *C08F 14/06* (2006.01)
 *C09D 133/16* (2006.01)

(52) U.S. Cl.
 CPC ............ *C09D 133/16* (2013.01); *C08F 214/18* (2013.01); *C08F 214/188* (2013.01); *Y10T 428/3154* (2015.04); *Y10T 428/31855* (2015.04)

(58) Field of Classification Search
 USPC .................... 522/186, 181, 187; 526/242, 247
 IPC ........................ C08F 214/18,214/188
 See application file for complete search history.

(56) References Cited

U.S. PATENT DOCUMENTS

| | | | |
|---|---|---|---|
| 3,250,808 A | 5/1966 | Moore et al. | |
| 3,544,537 A | 12/1970 | Wheaton | |
| 3,553,179 A | 1/1971 | Bartlett | |
| 3,810,874 A | 5/1974 | Mitsch et al. | |
| 4,262,072 A | 4/1981 | Wendling et al. | |
| 4,472,480 A | 9/1984 | Olson | |
| 4,567,073 A | 1/1986 | Larson et al. | |
| 4,614,667 A | 9/1986 | Larson et al. | |
| 4,654,233 A | 3/1987 | Grant et al. | |
| 4,681,925 A | 7/1987 | Strepparola et al. | |
| 4,732,941 A * | 3/1988 | Numa | 525/276 |
| 4,855,184 A | 8/1989 | Klum et al. | |
| 4,873,140 A | 10/1989 | McIntyre | |
| 4,885,332 A | 12/1989 | Bilkadi | |
| 4,968,116 A | 11/1990 | Hulme-Lowe et al. | |
| 4,971,424 A | 11/1990 | Babirad et al. | |
| 4,985,473 A | 1/1991 | Williams et al. | |
| 5,011,979 A | 4/1991 | Gregorio et al. | |
| 5,021,501 A | 6/1991 | Ohmori et al. | |
| 5,064,695 A | 11/1991 | Hotta et al. | |
| 5,152,287 A * | 10/1992 | Kane | 600/364 |
| 5,239,026 A | 8/1993 | Babirad et al. | |
| 5,326,823 A | 7/1994 | Rolando et al. | |
| 5,446,205 A | 8/1995 | Marchionni et al. | |
| 5,623,037 A | 4/1997 | Simeone et al. | |
| 5,648,407 A | 7/1997 | Goetz et al. | |
| 5,677,050 A | 10/1997 | Bilkadi et al. | |
| 5,948,478 A | 9/1999 | Lenti et al. | |
| 5,962,611 A | 10/1999 | Meijs et al. | |
| 6,132,861 A | 10/2000 | Kang et al. | |
| 6,224,949 B1 | 5/2001 | Wright et al. | |
| 6,238,798 B1 | 5/2001 | Kang et al. | |
| 6,245,833 B1 | 6/2001 | Kang et al. | |
| 6,299,799 B1 | 10/2001 | Craig et al. | |
| 6,376,572 B1 | 4/2002 | Turri | |
| 6,383,633 B1 | 5/2002 | Allewaert et al. | |
| 6,391,459 B1 | 5/2002 | Szum et al. | |
| 6,395,822 B1 | 5/2002 | Edgington | |
| 6,646,088 B2 | 11/2003 | Fan et al. | |
| 6,660,338 B1 | 12/2003 | Hargreaves | |
| 6,660,388 B2 * | 12/2003 | Liu et al. | 428/421 |
| 6,660,389 B2 | 12/2003 | Liu et al. | |
| 6,680,118 B2 | 1/2004 | Szum et al. | |
| 6,730,388 B2 | 5/2004 | MacQueen et al. | |
| 6,923,921 B2 | 8/2005 | Flynn et al. | |
| 6,995,222 B2 | 2/2006 | Buckanin et al. | |

(Continued)

FOREIGN PATENT DOCUMENTS

| | | |
|---|---|---|
| EP | 0247489 A | 12/1987 |
| EP | 0336372 A | 10/1989 |
| EP | 0443070 B1 | 8/1991 |
| EP | 0622353 A | 2/1994 |
| EP | 1571165 A | 9/2005 |
| JP | 61-101507 | 5/1986 |
| JP | 62-006427 | 1/1987 |
| JP | 1993/209030 A | 8/1993 |
| JP | 6-136062 | 5/1994 |

(Continued)

OTHER PUBLICATIONS

Bongiovanni, R.; Montefusco, F.; Priola, A.; Macchioni, N.; Lazzeri, S.; Sozzi, L.; Ameduri, B., Photocurable Wood Coatings Containing Fluorinated Monomers. Pitture e Vernici, European Coatings (2003), 79 (11), pp. 25-30.

(Continued)

*Primary Examiner* — Kevin R Kruer

(74) *Attorney, Agent, or Firm* — Julie Lapos-Kuchar; Pamela L. Stewart; Sean J. Edman

(57) ABSTRACT

The invention features a coating composition that comprises a non-urethane acrylate or methacrylate compound in combination with a fluorochemical. Typically, the non-urethane (meth)acrylate is an aliphatic or aromatic (meth)acrylate compound and the fluorochemical typically comprises a monofunctional (per)fluoropolyether (meth)acrylate compound. The coating compositions can provide a protective topcoat layer to a variety of substrates, including wood and vinyl.

15 Claims, No Drawings

(56) References Cited

U.S. PATENT DOCUMENTS

| | | |
|---|---|---|
| 7,094,829 B2 | 8/2006 | Audenaert et al. |
| 7,101,618 B2 | 9/2006 | Coggio et al. |
| 7,141,537 B2 | 11/2006 | Audenaert et al. |
| 7,173,778 B2 | 2/2007 | Jing et al. |
| 2001/0034458 A1* | 10/2001 | Anderson et al. ............ 560/184 |
| 2002/0115820 A1 | 8/2002 | Wang et al. |
| 2003/0060534 A1 | 3/2003 | Fukushima et al. |
| 2004/0048053 A1* | 3/2004 | Wu et al. ...................... 428/216 |
| 2004/0077238 A1 | 4/2004 | Audenaert et al. |
| 2005/0026414 A1 | 2/2005 | Williams |
| 2005/0072336 A1 | 4/2005 | Itoh et al. |
| 2005/0137355 A1 | 6/2005 | Buskanin et al. |
| 2005/0249940 A1 | 11/2005 | Klun et al. |
| 2005/0249942 A1 | 11/2005 | Coggio et al. |
| 2005/0249956 A1 | 11/2005 | Jing et al. |
| 2005/0250921 A1 | 11/2005 | Qiu et al. |
| 2006/0148350 A1 | 7/2006 | Chang et al. |
| 2006/0251885 A1 | 11/2006 | Coggio et al. |
| 2007/0014018 A1 | 1/2007 | Wheatley et al. |

FOREIGN PATENT DOCUMENTS

| | | |
|---|---|---|
| JP | 1999/080312 | 3/1999 |
| JP | 2000-284102 | 10/2000 |
| JP | 2003-047908 | 2/2003 |
| JP | 2004/204096 | 7/2004 |
| WO | 03/022906 | 3/2003 |
| WO | WO 03/072625 A1 | 9/2003 |
| WO | WO 03/100159 | 12/2003 |
| WO | WO 2004/002734 A1 | 1/2004 |
| WO | WO 2005/049687 A1 | 6/2005 |
| WO | WO 2005/113641 A1 | 12/2005 |
| WO | WO 2005/113642 A1 | 12/2005 |
| WO | WO 2005/113690 A2 | 12/2005 |
| WO | WO 2006/007507 A1 | 1/2006 |
| WO | WO 2006/074033 A1 | 7/2006 |

OTHER PUBLICATIONS

Bongiovanni, Roberta; Malucelli, Giulio; Priola, Aldo. UV-Curing of Fluorinated Systems: Synthesis and Properties. ACS Symposium Series (2003), 847 (Photoinitiated Polymerization), pp. 499-510.

Bongiovanni, R.; Lombardi, V.; Priola, A.; Tonelli, C.; Di Meo, A. Surface Properties of Acrylic Coatings Containing Perfluoropolyether Chains. Surface Coatings International, Part B: Coatings Transactions (2003), 86 (B1), pp. 53-57.

Bongiovanni, R.; Montefusco, F.; Priola, A.; Macchioni, N.; Lazzeri, S.; Sozzi, L.; Ameduri, B. High Performance UV-cured Coatings for Wood Protection. Progress in Organic Coatings (2002), 45(4), pp. 359-363.

Bongiovanni, Roberta; Malucelli, Giulio; Priola, Aldo. UV-Curing of Fluorinated Systems: Synthesis and Properties. Polymer Preprints (American Chemical Society, Division of Polymer Chemistry) (2001), 42(2), pp. 801-802.

Bongiovanni, R.; Beamson, G.; Mamo, A.; Priola, A.; Recca, A.; Tonelli, C. High Resolution XPS Investigation of Photocured Films Containing Perfluoropolyether Acrylates. Polymer (1999), Volume Dare 2000, 41(2), pp. 409-414.

Bongiovanni, R.; Malucelli, G.; Priola, A. High Performance UV-Cured Coatings Containing Fluorinated Monomers. Pigment & Resin Techology (1999), 28(1), 26-30.

Ameduri, B.; Bongiovanni, R.; Malucelli, G.; Pollicino, A.; Priola, A. New Fluorinated Acrylic Monomers for the Surface Modification of UV-Curable Systems. Journal of Polymer Science, Part A: Polymer Chemistry (1999), 37(1), pp. 77-87.

Bongiovanni, Roberts; Malucelli, Giulio; Pollicino, Antonino; Tonelli, Claudio; Simeone, Giovanni; Priola, Aldo. PerFluoropolyether Structures as Surfaces Modifying Agents of UV-Curable Systems. Macromolecular Chemistry and Physics (1998), 199(6), pp. 1099-1105.

Priola, Aldo; Bongiovanni, Roberta; Malucelli, Giulio; Pollicino, Antonino; Tonelli, Claudio; Simeone, Giovanni. UV-Curable Systems Containing Perfluoropolyether Structures. Synthesis and Characterization. Macromolecular Chemistry and Physics (1997), 198(6), pp. 1893-1907.

Viengkhou, Visay; NG, oo-Tech, Garnett, John L., Role of Additives on UV Curable Coatings on Wood, Journal of Applied Polymer Science, vol. 61, (1996) pp. 2361-2366.

Ameduri, B.; Bongiovanni, R.; Lombardi, V.; Pollicino, A.; Priola, A.; Recca, A., Effect of the Structural. Parameters of a Series of Fluoromonoacrylates on the Surface Properties of Cured Films, Journal of Polymer Science: Part A: Polymer Chemistry, vol. 39, (20021), pp. 4227-4235.

U.S. Appl. No. 11/571,055, filed Jun. 30, 2005, Hardcoat Compositions and Methods.

U.S. Appl. No. 11/279,653, filed Apr. 13, 2006, Method of Making Urethane Based Fluorinated Monomers.

U.S. Appl. No. 11/279,657, filed Apr. 13, 2006, Flooring Substrate Having a Coating of a Curable Composition.

U.S. Appl. No. 60/640,471, filed Dec. 20, 2004, Chang et al.

International Preliminary Report on Patentability for PCT/US2005/047350; 6 pgs.

European Office Action dated Jul. 1, 2010 for European Patent Application No. 05 855 844.6; 4 pgs.

* cited by examiner

STAIN-RESISTANT FLUOROCHEMICAL COMPOSITIONS

CROSS REFERENCE TO RELATED APPLICATIONS

This application claims the benefit of U.S. Provisional Application No. 60/640,471, filed Dec. 30, 2004.

FIELD OF THE INVENTION

The present invention relates to coating compositions. More specifically, the invention relates to coating compositions comprising a non-urethane (meth)acryl compound and a fluorochemical.

BACKGROUND

Certain commonly used materials, such as optical displays, textiles, metlas, stone, wood, leather, etc, are susceptible to scratches, abrasion, and soiling during routine use. In some instances, protective films or coatings may be applied to the surfaces of these materials in order to provide protection and enhance durability, performance, and appearance.

UV-curable systems based on the polymerization of an acrylic resin, such as a urethane (meth)acrylate compound, have been used as protective coating compositions for a variety of surfaces. In some instances, it may be desirable to modify or enhance the performance of these coatings by introducing particular structures, such as fluorinated groups, into the polymeric network. Fluorinated groups can be incorporated into these compositions through the copolymerization of the acrylic resin with a low amount (<1%, w/w) of a fluorinated monomer, such as a fluorinated acrylate compound.

Although various protective coatings have been developed using fluorinated polymers, a need remains for improved coating compositions with better performance and longevity than existing systems.

SUMMARY OF INVENTION

In is often desirable for a protective topcoat layer to be stain-resistant in order to improve the look and appearance of the coated surface. One approach for providing stain resistance is to incorporate a fluorochemical compound into the topcoat composition. We found that, under certain circumstances, ambient light can degrade urethane-containing topcoats thus reducing the stain resistance of the fluorochemical additives. We have also found that certain stains and dyes have a high affinity for the urethane-groups present in many of the acrylate materials that are typically used in protective surface coating compositions, thereby hindering the improved stain resistance provided by the fluorochemical.

Accordingly, the present invention features a coating composition that comprises a non-urethane acryl or methacryl compound in combination with a fluorochemical. Typically, the non-urethane (meth)acryl compound is an aliphatic or aromatic (meth)acryl compound. The fluorochemical typically comprises a monofunctional (per)fluoropolyether (meth)acryl compound or a $C_8F_{17}C_2H_4O_2CCH{=}CH_2$ telomer. In other embodiments, the fluorochemical may be $C_4F_9SO_2NMrC_2H_4OC(O)CRCH_2$, $C_4F_9CH_2CH_2OC(O)CH{=}CH_2$, or $C_6F_{13}CH_2CH_2OC(O)CRCH_2$ wherein R is H, methyl or other lower alkyl In yet another embodiment, the fluorochemical may comprise a compound represented by the structure $C_pF_{2p+1}SO_2(R)C_2H_4O_2CCH{=}CH_2$, where R is a O, to $C_6$ alkyl group.

In yet another embodiment, the fluorochemical may comprise a compound represented by the formula $C_pF_{2p+1}C_2H_4O_2CCH{=}CH_2$, where p is a 3, to 20 and preferably averages between 6 and 8.

In some embodiments of the invention, the coating composition may comprise a combination of a urethane (meth)acryl compound and a non-urethane (meth)acryl compound. Typically, the coating composition contains less than 50 percent, more typically less than 30 percent, most typically less than 10 percent by weight of a urethane-containing (meth)acrylate. In other embodiments, the coating composition is substantially free of urethane (meth)acrylate.

The compositions of the invention are typically photopolymerizable and thus may further include a photoinitiator. The compositions may be coated onto a substrate and then polymerized, for example, by exposure to UV radiation. The reaction product of the non-urethane (meth)acryl compound and the fluorochemical monomer(s) forms a stain-resistance protective topcoat on the substrate that maintains it stain resistance even after prolonged exposure to ambient light conditions.

The coating composition of the invention may be used provide a protective topcoat on a variety of substrate surfaces, such as, for example, wood and vinyl.

Other features and advantages of the present invention will be apparent from the following detailed description thereof, and from the claims.

DEFINITIONS

As used herein, the term "non-urethane (meth)acryl compound" means a monomer or oligomer having at least one, preferably two or more acryl or methacyl groups without any urethane groups. The term "(meth)acryl" includes both acryl and methacyl compounds.

By "aliphatic (meth)acryl compound" is meant a monomer or oligomer having at least one, preferably two or more acryl or methacryl groups which are linked by an aliphatic segment that is acyclic or cyclic with one or more optional heteroatoms independently selected from the group consisting of O, N, and S.

By "aromatic (meth)acryl" is meant a monomer or oligomer having at least one, preferably two or more acryl or methacryl groups and at least one or more aromatic rings.

By "(per)fluoropolyether (meth)acryl compound" is meant a compound comprising at least one (per)fluoropolyether group and at least one (meth)acryl group, which are typically joined by a linking group. Typically, the (meth)acryl group is a (meth)acrylate group optionally substituted with hydrogen or fluorine. In at least some embodiments, acrylate groups are preferred. As used herein, (meth)acryl groups includes those class of compounds such as (meth)acrylate esters, (meth)acrylamides, and N-alkyl (meth)acrylamides, optionally substituted with hydrogen or fluorine. Preferably, the (meth)acryl group is a (meth)acrylate group optionally substituted with hydrogen or fluorine. In at least some embodiments, acrylate groups are preferred.

By "monoterminated (per)fluoropolyether (meth)acryl compound" is meant a compound that can be represented by the following Formula I:

R'O—X-Q-R"         (Formula I)

wherein R' is F, $CF_3$, $C_2F_5$, or $C_3F_7$; X is a (per)fluorpolyether group; Q is —C(O)NH(CH_2)_a, or —(CH_2)_bO(CH_2)_a wherein a is 1-5 and b is 1-5, preferably 1; and R" is —OC(O)CH=CH$_2$, —C(O)NH(C$_2$H$_4$O)$_b$(CH$_2$)$_a$, —OC(O)CMe=CH$_2$, —OC(O)NHCH$_2$CH$_2$OC(O)CMe=CH$_2$, —CH(OC(O)CH=CH$_2$)$_2$, —CH(OC(O)CMe=CH$_2$)$_2$, —N(CH$_2$CH$_2$OC(O)CH=CH$_2$)$_2$, —N(CH$_2$CH$_2$OC(O)CMe=CH$_2$)$_2$, —N(—C(O)CH=CH$_2$)(—CH$_2$CH$_2$OC(O)CH=CH$_2$), —NMeCH$_2$CH$_2$CO$_2$CH$_2$CEt(CH$_2$OC(O)CH=CH$_2$)$_2$ or —O-triurethane(NHCO$_2$CH$_2$CH$_2$OC(O)CH=CH$_2$)$_2$ or a compound that can be represented by the following Formula II

 (Formula II)

wherein R$_f$ is a monofunctional terminal group selected from the group consisting of (per)fluoropolyether groups; X and W are optional linking groups, which may or may not be present and each W may be the same or different, and R$_A$ is a (meth)acryl group or —C(O)CF=CH$_2$; and y is 1 or 2.

By "hardcoat" or "topcoat" is meant a crosslinkable or crosslinked composition that optionally comprises inorganic articles.

As used herein "wt-%" refers to weight percent solids based on the coating composition or reaction product thereof unless specified otherwise.

The recitation herein of numerical ranges by endpoints includes all numbers subsumed within that range (e.g., 1 to 5 includes 1, 1.5, 2, 2.75, 3, 3.80, 4 and 5).

As used in this specification and the appended claims, the singular forms "a", "an", and "the" also include the plural forms unless the context clearly dictates otherwise. Thus, for example, reference to a composition containing "a compound" includes a mixture of two or more compounds. In addition, the term "or" is generally used in the sense of "and/or" unless the context clearly dictates otherwise.

Unless otherwise indicated, all numbers expressing quantities of ingredients, measurement of properties such as surface energy, contact angles, and so forth used in the instant specification and claims are to be understood as being modified in all instances by the term "about." Accordingly, unless indicated to the contrary, the numerical parameters set forth in the specification and attached claims are approximations that can vary depending upon the desired properties sought by those skilled in the art utilizing the teachings of the present invention. At the very least, and not as an attempt to limit the application of the doctrine of equivalents to the scope of the claims, each numerical parameter should at least be construed in light of the number of reported significant digits by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors and uncertainties necessarily resulting from the standard deviations found in their respective testing measurements.

DETAILED DESCRIPTION

The present invention features polymerizable coating compositions comprising at least one non-urethane (meth)acryl compound and at least one fluorochemical. The non-urethane (meth)acyl compound can be an aliphatic or aromatic (meth)acryl compound and is typically not a fluorochemical. In some embodiments, the fluorochemical component of the composition is a monoterminated (per)fluoropolyether (meth)acryl compound.

The coating compositions of the invention may be applied to the surface of a substrate, such as, for example, vinyl or wood, and then polymerized to provide a stain-resistant topcoat. This protective layer generally has good light stability and can be exposed to fluorescent lighting for prolonged periods of time without undue deterioration of its stain-resistance properties.

(Meth)acryl Monomers and Oligomers

The non-urethane (meth)acryl compound used in the coating compositions of the present invention can be any monomer or oligomer having at least two acryl or methacryl groups without any urethane groups. Examples of suitable non-urethane (meth)acryl compounds include, but are not limited to, tripropyleneglycol diacrylate available under the trade designation "SR306", trimethylolpropane ethyoxylated (3) triacrylate available under the trade designation "SR454", and trimethylolpropane propoxylated (3) triacrylate, available under the trade designation "SR492", bis-phenol A ethoxylated diacrylate, available under the trade designation "SR349", all from Sartomer Company, Exton, Pa.

The non-urethane (meth)acryl compound may optionally be blended with one or more additional poly(meth)acrylates, including urethane (meth)acryl compounds and/or other non-urethane (meth)acryl compounds. For example, the non-urethane (meth)acryl compound may be combined with a urethane-containing (meth)acryl compound in a weight ratio of 9 to 1, 5 to 1, 4 to 1, 3 to 1, or 1 to 1 (non-urethane to urethane (methacrylate)). In blended formulations, typically the compositions comprise less that about 50%, more typically less than 30%, and most typically less than 10% by weight of a urethane-containing (meth)acryl compound.

Useful additional poly(meth)acrylates include, for example, di(meth)acryl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, tripropylene glycol diacrylate; tri(meth)acryl containing compounds such as glycerol triacrylate, trimethylolpropane triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), pentaerythritol triacrylate, propoxylated triacrylates (e.g., propoxylated (3) glyceryl triacrylate, propoxylated (5.5) glyceryl triacrylate, propoxylated (3) trimethylolpropane triacrylate, propoxylated (6) trimethylolpropane triacrylate), trimethylolpropane triacrylate, tris(2-hydroxyethyl)isocyanurate triacrylate; higher functionality (meth)acryl containing compounds such as ditrimethylolpropane tetraacrylate, dipentaerythritol pentaacrylate, ethoxylated (4) pentaerythritol tetraacrylate, pentaerythritol tetraacrylate, caprolactone modified dipentaerythritol hexaacrylate; oligomeric (meth)

acryl compounds such as, for example, polyester acrylates, epoxy acrylates; polyacrylamide analogues of the foregoing; and combinations thereof. Such compounds are widely available from vendors such as, for example, Sartomer Company, Exton, Pa.; UCB Chemicals Corporation, Smyrna, Ga.; and Aldrich Chemical Company, Milwaukee, Wis. Additional useful (meth)acrylate materials include hydantoin moiety-containing poly(meth)acrylates, for example, as described in U.S. Pat. No. 4,262,072 (Wendling et al.).

Fluorochemicals

The coating compositions of the invention also include a fluorochemical component, which may comprise a single (per)fluoropolyether (meth)acryl compound, or various combinations of monofunctional (per)fluoropolyether (meth) acryl compound(s), combinations of polyfunctional (per) fluoropolyether (meth)acryl compounds, as well as combinations one or more monofunctional (per)fluoropolyether (meth)acryl compound(s) in combination with one or more polyfunctional (per)fluoropolyether (meth)acryl compounds.

Typically the (per)fluoropolyether (meth)acryl component comprises less than 0.5% of the total coating composition, and the non-fluorinated (meth)acryl component (e.g., the non-urethane (meth)acrylate or poly(meth)acrylate blend) comprises 99.5% or greater and more preferably 99.9% or greater of the total composition. The total amount of (per) fluoropolyether (meth)acryl compound in the coating composition that is polymerized to form the topcoat is typically less than 0.5 wt-% (e.g. less than about 0.1 wt-%, 0.2 wt-%, 0.3 wt-%, and 0.4 wt-%).

A variety of (per)fluoropolyether (meth)acryl compounds may be employed in the coating compositions of the invention. In some implementations of the invention, it is preferred to use a monoterminated (per)fluoropolyether (meth)acrylate compound represented by the following Formula I:

wherein R' is F, $CF_3$, $C_2F_5$, or $C_3F_7$; X is a (per)fluorpolyether group; Q is $-C(O)NH(CH_2)_a$ or $-(CH_2)_bO(CH_2)_a$ wherein a is 1-5 and b is 1; and R" is $-OC(O)CH=CH_2$, $-OC(O)CMe=CH_2$, $-OC(O)NHCH_2CH_2OC(O)CMe=CH_2$, $-CH(OC(O)CH=CH_2)_2$, $-CH(OC(O)CMe=CH_2)_2$, $-N(CH_2CH_2OC(O)CH=CH_2)_2$, $-N(CH_2CH_2OC(O)CMe=CH_2)_2$, $-N(-C(O)CH=CH_2)(-CH_2CH_2OC(O)CH=CH_2)$, $-NMeCH_2CH_2CO_2CH_2CEt(CH_2OC(O)CH=CH_2)_2$ or $-O$-triurethane$(NHCO_2CH_2CH_2OC(O)CH=CH_2)_2$.

Other suitable perfluoropolyether (meth)acryl compounds that may be used in the coating composition include those represented by the following Formula II:

wherein $R_f$ is (per)fluoropolyether group; W is a linking group; and $R_A$ is a (meth)acryl group or $-COCF=CH_2$; and w is 1 or 2.

The perfluoropolyether group $R_f$ can be linear, branched, cyclic, or combinations thereof and can be saturated or unsaturated. The perfluoropolyether has at least two catenated oxygen heteroatoms. Exemplary perfluoropolyethers include, but are not limited to, those that have perfluorinated repeating units selected from the group of $-(C_pF_{2p})-$, $-(C_pF_{2p}O)-$, $-(CF(Z))-$, $-(CF(Z)O)-$, $-(CF(Z)C_pF_{2p}O)-$, $-(C_pF_{2p}CF(Z)O)-$, $-(CF_2CF(Z)O)-$, or combinations thereof. In these repeating units, p is typically an integer of 1 to 10. In some embodiments, p is an integer of 1 to 8, 1 to 6, 1 to 4, or 1 to 3. The group Z is a perfluoroalkyl group, perfluoroether group, perfluoropolyether, or a perfluoroalkoxy group, all of which can be linear, branched, or cyclic. The Z group typically has no more than 12 carbon atoms, no more than 10 carbon atoms, or no more than 9 carbon atoms, no more than 4 carbon atoms, no more than 3 carbon atoms, no more than 2 carbon atoms, or no more than 1 carbon atom. In some embodiments, the Z group can have no more than 4, no more than 3, no more than 2, no more than 1, or no oxygen atoms. In these perfluoropolyether structures, the different repeat units can be distributed randomly along the chain.

In certain embodiments, $R_f$ can be monovalent or divalent. Where $R_f$ is monovalent, the terminal groups can be $(C_pF_{2p+1})-$, $(C_pF_{2p+1}O)-$, $(X'C_pF_{2p}O)-$, or $(X'C_pF_{2p+1})-$ where X' is hydrogen, chlorine, or bromine and p is an integer of 1 to 10. In some embodiments of monovalent $R_f$ groups, the terminal group is perfluorinated and p is an integer of 1 to 10, 1 to 8, 1 to 6, 1 to 4, or 1 to 3. Exemplary monovalent $R_f$ groups include $CF_3O(C_2F_4O)_nCF_2-$, and $C_3F_7O(CF(CF_3)CF_2O)_nCF(CF_3)-$ wherein n has an average value of 0 to 50, 1 to 50, 3 to 30, 3 to 15, or 3 to 10.

Suitable structures for divalent $R_f$ groups include, but are not limited to, $CF_2O(CF_2O)_q(C_2F_4O)_nCF_2-$, $-(CF_2)_3O(C_4F_8O)_n(CF_2)_3-$, $-CF_2O(C_2F_4O)_nCF_2-$, and $-CF(CF_3)(OCF_2CF(CF_3))_sOC_tF_{2t}O(CF(CF_3)CF_2O)_nCF(CF_3)-$, wherein q has an average value of 0 to 50, 1 to 50, 3 to 30, 3 to 15, or 3 to 10; n has an average value of 0 to 50, 3 to 30, 3 to 15, or 3 to 10; s has an average value of 0 to 50, 1 to 50, 3 to 30, 3 to 15, or 3 to 10; the sum (n+s) has an average value of 0 to 50 or 4 to 40; the sum (q+n) is greater than 0; and t is an integer of 2 to 6.

As synthesized, compounds according to Formula II typically include a mixture of $R_f$ groups. The average structure is the structure averaged over the mixture components. The values of q, n, and s in these average structures can vary, as long as the compound has a number average molecular weight of at least about 400. Compounds of Formula I often have a molecular weight (number average) of 400 to 5000, 800 to 4000, or 1000 to 3000.

The linking group W between the perfluoropolyether segment and (meth)acryl or $-COCF=CH_2$ endgroup includes a divalent group selected from an alkylene, arylene, heteroalkylene, or combinations thereof and an optional divalent group selected from carbonyl, carbonyloxy, carbonylimino, sulfonamido, or combinations thereof. W can be unsubstituted or substituted with an alkyl, aryl, halo, or combinations thereof. The W group typically has no more than 30 carbon atoms. In some compounds, the W group has no more than 20 carbon atoms, no more than 10 carbon atoms, no more than 6 carbon atoms, or no more than 4 carbon atoms. For example, W can be an alkylene, an alkylene substituted with an aryl group, or an alkylene in combination with an arylene.

The perfluoropolyether acrylate compounds (e.g. of Formula II) can be synthesized by known techniques such as described in U.S. Pat. Nos. 3,553,179 and 3,544,537.

Alternatively or in addition to at least one monofunctional (per)fluoropolyether acrylate compound, the (per)fluoropolyether acrylate compound may be polyfunctional, having two or more (meth)acryl groups such as (meth)acrylate groups.

One type of preferred polyfunctional perfluoropolyether acrylate compounds comprises at least one terminal $F(CF(CF_3)CF_2O)aCF(CF_3)-$ group wherein a averages 4 to 15. In some embodiments, the polyfunctional perfluoropolyether acrylates comprises a terminal HFPO— group. As used herein "HFPO—" refers to the structure $F(CF(CF_3)$ CF$_2$O)aCF(CF$_3$)— wherein a averages 6 to 7 (e.g. 6.3). Exemplary compounds include for example HFPO—C(O)N(H)C(CH$_2$OC(O)CH=CH$_2$)$_2$CH$_2$CH$_3$, and HFPO—C(O)N(H)C(CH$_2$OC(O)CH=CH$_2$)$_2$H.

The perfluoropolyther acrylate comprising at least one terminal HFPO— group and at least two (meth)acryl groups can be prepared in a two step process. The first step is by reaction of poly(hexafluoropropylene oxide) esters, such as HFPO—C(O)OCH$_3$ or acid halides HFPO—C(O)F, with materials containing at least 3 alcohol or primary or secondary amino groups to produce HFPO— amide polyols or polyamines, HFPO— ester polyols or polyamines, or HFPO— amides, or HFPO— esters with mixed amine and alcohol groups. The second is (meth)acrylation of the alcohol and/or amine groups with (meth)acryloyl halides, (meth)acrylic anhydrides or (meth)acrylic acid. Exemplary syntheses thereof are set forth in the examples.

In other embodiments, the (per)fluoropolyether acrylate compound may be a compound preparable by Michael-type addition of a reactive (per)fluoropolyether with a poly(meth)acrylate, such as the adduct of HFPO—C(O)N(H)CH$_2$CH$_2$CH$_2$N(H)CH$_3$ with trimethylolpropane triacrylate (TMPTA). Such (per)fluoropolyether acrylate compounds are further described in U.S. patent application Ser. No. 10/841,792 "Polymerizable Compositions, Methods of Making the Same, and Composite Articles Therefrom", filed on May 7, 2004.

The coating composition described herein may comprise a monofunctional fluorinated compound that can be represented by the following Formula III:

(Formula III)

wherein R$_A$ is as previously described (i.e. a (meth)acrylate or a CH$_2$=CFCO group); R$^{F1}$ is a fluoroalkylene group comprising 2 to 7 carbon atoms; and W' is a linking group. R$_A$ of Formula III is preferably an acrylate group. R$^{F1}$ may be a linear or branched perfluorinated alkylene moiety.

Other suitable perfluoropolyether monomers are described by Larson, et al., in U.S. Pat. No. 4,614,667 at column 4, lines 24-55, cited portion.

The monofunctional fluorinated compounds of Formula III can be synthesized by known techniques. An exemplary monofunctional fluorinated compound of Formula III, ω-hydro 2,2,3,3,4,4,5,5-octafluoropentyl acrylate (H—C$_4$F$_8$—CH$_2$O—C(O)—CH=CH$_2$), is commercially available from Oakwood Products, West Columbia, S.C. Monofunctional fluorinated compounds of Formula III having the formula H(CF$_2$)nCH$_2$OCOCH=CH$_2$ where n=2, 4, and 6 as well as CF$_3$CHFCF$_2$CH$_2$OCOC(CH$_3$)CH$_2$ (2,2,3,4,4,4 hexafluorobutyl methacrylate) are commercially available from Lancaster Chemical, Windham, N.H.

The inclusion of one or more monofunctional fluorinated compounds of Formula III can further improve the compatibility of at least certain perfluoropolyether acrylate compounds with the poly(meth)acrylate crosslinking agents. This aspect is particularly advantageous for embodiments wherein a monofunctional perfluoropolyether acrylate compound is employed such HFPO—C(O)N(H)CH$_2$CH$_2$OC(O)CH=CH$_2$.

The amount of monofunctional fluorinated compound(s) of Formula III utilized in the coating composition of the invention can vary depending on the kind and amount of (per)fluoropolyether acrylate compound employed. Typically, the amount ranges from about half the amount of the (per)fluoropolyether acrylate compound to about twice the amount of the (per)fluoropolyether acrylate compound.

Initiators for Polymerization of the Coating Composition

To facilitate curing, polymerizable compositions according to the present invention may further comprise at least one free-radical thermal initiator and/or photoinitiator. Typically, if such an initiator and/or photoinitiator are present, it comprises less than about 10 percent by weight, more typically less than about 5 percent of the polymerizable composition, based on the total weight of the polymerizable composition. Free-radical curing techniques are well known in the art and include, for example, thermal curing methods as well as radiation curing methods such as electron beam or ultraviolet radiation. Further details concerning free radical thermal and photopolymerization techniques may be found in, for example, U.S. Pat. No. 4,654,233 (Grant et al.); U.S. Pat. No. 4,855,184 (Klun et al.); and U.S. Pat. No. 6,224,949 (Wright et al.).

Useful free-radical thermal initiators include, for example, azo, peroxide, persulfate, and redox initiators, and combinations thereof.

Useful free-radical photoinitiators include, for example, those known as useful in the UV cure of acrylate polymers. Such initiators include benzophenone and its derivatives; benzoin, alpha-methylbenzoin, alpha-phenylbenzoin, alpha-allylbenzoin, alpha-benzylbenzoin; benzoin ethers such as benzil dimethyl ketal (commercially available under the trade designation "IRGACURE 651" from Ciba Specialty Chemicals Corporation of Tarrytown, N.Y.), benzoin methyl ether, benzoin ethyl ether, benzoin n-butyl ether; acetophenone and its derivatives such as 2-hydroxy-2-methyl-1-phenyl-1-propanone (commercially available under the trade designation "DAROCUR 1173" from Ciba Specialty Chemicals Corporation) and 1-hydroxycyclohexyl phenyl ketone (commercially available under the trade designation "IRGACURE 184", also from Ciba Specialty Chemicals Corporation); 2-methyl-1-[4-(methylthio)phenyl]-2-(4-morpholinyl)-1-propanone commercially available under the trade designation "IRGACURE 907", also from Ciba Specialty Chemicals Corporation); 2-benzyl-2-(dimethylamino)-1-[4-(4-morpholinyl)phenyl]-1-butanone commercially available under the trade designation "IRGACURE 369" from Ciba Specialty Chemicals Corporation); aromatic ketones such as benzophenone and its derivatives and anthraquinone and its derivatives; onium salts such as diazonium salts, iodonium salts, sulfonium salts; titanium complexes such as, for example, that which is commercially available under the trade designation "CGI 784 DC", also from Ciba Specialty Chemicals Corporation); halomethylnitrobenzenes; and mono- and bis-acylphosphines such as those available from Ciba Specialty Chemicals Corporation under the trade designations "IRGACURE 1700", "IRGACURE 1800", "IRGACURE 1850", "IRGACURE 819" "IRGACURE 2005", "IRGACURE 2010", "IRGACURE 2020" and "DAROCUR 4265". Combinations of two or more photoinitiators may be used. Further, sensitizers such as 2-isopropyl thioxanthone, commercially available from First Chemical Corporation, Pascagoula, Miss., may be used in conjunction with photoinitiator(s) such as "IRGACURE 369".

Other Reactive and Non-Reactive Ingredients

A variety of inorganic oxide particles can be used in the coating compositions. The particles are typically substantially spherical in shape and relatively uniform in size. The particles can have a substantially monodisperse size distribution or a polymodal distribution obtained by blending two or more substantially monodisperse distributions. The inorganic oxide particles are typically non-aggregated (substantially discrete), as aggregation can result in precipitation of the inorganic oxide particles or gelation of the hardcoat. The inorganic oxide particles are typically colloidal in size, having an average particle diameter of about 0.001 to about 0.2 micrometers, less than about 0.05 micrometers, and less than about 0.03 micrometers. These size ranges facilitate dispersion of the inorganic oxide particles into the binder resin and provide ceramers with desirable surface properties and optical clarity. The average particle size of the inorganic oxide particles can be measured using transmission electron microscopy to count the number of inorganic oxide particles of a given diameter. Inorganic oxide particles include colloidal silica, colloidal titania, colloidal alumina, colloidal zirconia, colloidal vanadia, colloidal chromia, colloidal iron oxide, colloidal antimony oxide, colloidal tin oxide, and mixtures thereof. The inorganic oxide particles can consist essentially of or consist of a single oxide such as silica, or can comprise a combination of oxides, such as silica and aluminum oxide, or a core of an oxide of one type (or a core of a material other than a metal oxide) on which is deposited an oxide of another type. Silica is a common inorganic particle. The inorganic oxide particles are often provided in the form of a sol containing a colloidal dispersion of inorganic oxide particles in liquid media. The sol can be prepared using a variety of techniques and in a variety of forms including hydrosols (where water serves as the liquid medium), organosols (where organic liquids so serve), and mixed sols (where the liquid medium contains both water and an organic liquid), e.g., as described in U.S. Pat. No. 5,648,407 (Goetz et al.); U.S. Pat. No. 5,677,050 (Bilkadi et al.) and U.S. Pat. No. 6,299,799 (Craig et al.). Aqueous sols (e.g. of amorphous silica) can be employed. Sols generally contain at least 2 wt-%, at least 10 wt-%, at least 15 wt-%, at least 25 wt-%, and often at least 35 wt-% colloidal inorganic oxide particles based on the total weight of the sol. The amount of colloidal inorganic oxide particle is typically no more than 50 wt-% (e.g. 45 wt-%). The surface of the inorganic particles can be "acrylate functionalized" as described in Bilkadi et al. The sols can also be matched to the pH of the binder, and can contain counterions or water-soluble compounds (e.g., sodium aluminate).

The coating compositions can conveniently be prepared by mixing an aqueous sol of inorganic oxide particles with a free-radically curable binder precursor (e.g., one or more free-radically curable monomers, oligomers or polymers that can participate in a crosslinking reaction upon exposure to a suitable source of curing energy). The resulting composition usually is dried before it is applied, in order to remove substantially all of the water. This drying step is sometimes referred to as "stripping". An organic solvent can be added to the resulting ceramer composition before it is applied, in order to impart improved viscosity characteristics and assist in coating the ceramer composition onto the substrate. After coating, the ceramer composition can be dried to remove any added solvent, and then can be at least partially hardened by exposing the dried composition to a suitable source of energy in order to bring about at least partial cure of the free-radically curable binder precursor.

The coating composition described herein may further various other reactive and non-reactive ingredients. For example the composition may comprise polymerizable (meth)acryl compounds with alkyl, perfluoroalkyl, and perfluoroalkylene moieties. Examples of these compounds include butyl acrylate, 1H,1H-2,2,3,3,4,4,4-heptafluorobutyl acrylate, available from Sigma-Aldrich; 1H,1H,2H,2H-perfluorodecyl acrylate, available from Lancaster Synthesis, Windham, N.H.; and $C_4F_9SO_2N(CH_3)CH_2CH_2OC(O)CH=CH_2$ made by the procedure of Examples 2A and 2B of WO01/30873A. Numerous other (meth)acryl compounds with perfluoroalkyl moieties are mentioned in U.S. Pat. No. 4,968,116 and in U.S. Pat. No. 5,239,026 (including (perfluorocyclohexyl)methyl acrylate).

The compositions described herein are typically, thought not always, free of hydrophilic ingredients since the inclusion of such tends to reduce anti-soiling properties as well as stain certain media. Hydrophilic components are also susceptible to degradation upon exposure to aqueous based cleaning agents.

Those skilled in the art appreciate that the coating compositions can contain other optional adjuvants, such as, binders, surfactants, antistatic agents (e.g., conductive polymers), leveling agents, matting agents (e.g., silica particles), photosensitizers, ultraviolet ("UV") absorbers, stabilizers, antioxidants, lubricants, pigments, dyes, plasticizers, suspending agents and the like. Other particles which may be included in the compositions are described in U.S. Pat. No. 6,730,388.

The hardcoat formulation can be water-based or solvent-based or 100% solids with no solvent. Where appropriate, polymerizable components can optionally be diluted, for example, to 10 percent by weight total solids in methyl ethyl ketone. Two percent by weight of a photoinitiator such as DAROCUE 1173 (Ciba Specialty Products, Terrytown, N.Y.) may be included in the polymerizable compositions using a 10 percent solids photoinitiator solutions in methyl ethyl ketone. The photoinitiator can be added before dilution to the final percent by weight total solids. Dilution to the final percent by weight total solids can be achieved. achieved using methyl isobutyl ketone.

Application of Coating Composition to the Substrate

The coating composition can be applied to the hardcoat using a variety of conventional coating methods. Suitable coating methods include, for example, spin coating, knife coating, die coating, wire coating, flood coating, padding, spraying, roll coating, dipping, brushing, foam application, and the like. The coating is dried, typically using a forced air oven. The dried coating is at least partially and typically completely cured using an energy source.

Preferred energy sources include ultraviolet light curing devices that provide a UV "C" dosage of about 5 to 60 millijoules per square centimeter ($mJ/cm^2$). Preferably curing takes place in an environment containing low amounts of oxygen, e.g., less than about 100 parts per million. Nitrogen gas is a preferred environment.

Preferably the coating composition is applied at a sufficient amount to provide a cured layer having a thickness of at least about 10 nanometers, and preferably at least about 25 nanometers. Typically, the cured layer has a thickness of less than about 50 mils, preferably less than about 10 mils, and more preferably less than about 5 mils. Accordingly, the bulk of the durability is provided by the underlying coating layer.

The coating compositions may be applied to a variety of substrates, including those identified in a U.S. patent application entitled "Articles Comprising A Fluorochemical Surface Layer and Related Methods," having U.S. Provisional Patent Application No. 60/640,478, filed on Dec. 30, 2004.

Further features and advantages of this invention are further illustrated by the following examples, which are in no way intended to be limiting thereof. The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

EXAMPLES

As used in the following examples, "HFPO—" refers to the end group $F(CF(CF_3)CF_2O)aCF(CF_3)$— wherein "a" ranges between 5 and 12, and averages about 6.3, with an average molecular weight of 1,211 g/mol, and which can be prepared according to the method reported in U.S. Pat. No. 3,250,808 (Moore et al.).

Preparation of Fluorochemical Compounds

The following fluorochemical compounds HFPO-MA and LTMDA, designated herein as FC-1 and FC-2, respectively, and shown in Table 1, were used the following examples. The preparation of HFPO-MA and LTMDA are described below.

TABLE 1

Fluorochemical compounds

| Fluorochemical | Name/Description |
|---|---|
| FC-1 (HFPO-MA) | HFPO-MA, having the formula $F(CF(CF_3)CF_2O)aCF(CF_3)C(O)N(H)CH_2CH_2OC(O)C(CH_3)\!=\!CH_2$, wherein a averages between 5 to 12 |
| FC-2 (LTMDA) | LTMDA having the approximate formula $H_2C\!=\!CHCO_2CH_2CF_2O(CF_2O)_x(CF_2CF_2O)_y\cdot CF_2CH_2O_2CHC\!=\!CH_2$ |

1. Preparation of Monofunctional Perfluoropolyether Methacrylate, HFPO—C(O)N(H)CH$_2$CH$_2$OC(O)C(CH$_3$)=CH$_2$, (FC-1)

HFPO—C(O)N(H)CH$_2$CH$_2$OC(O)C(CH$_3$)=CH$_2$ (HFPO-AEMA) (FC-2) is made by a procedure similar to that described in U.S. Publication No. 2004-0077775, entitled "Fluorochemical Composition Comprising a Fluorinated Polymer and Treatment of a Fibrous Substrate Therewith," filed on May 24, 2002, for Synthesis of (HFPO)$_k$-methacrylate, substituting $F(CF(CF_3)CF_2O)_aCF(CF_3)C(O)NHCH_2CH_2OH$ with a=6.8, molecular weight 1344, for the $F(CF(CF_3)CF_2O)_aCF(CF_3)C(O)NHCH_2CH_2OH$ with a=10.5.

2. Preparation of LTMDA (FC-2)

LTMDA was prepared essentially in the same manner as described in example 15 of U.S. Pat. No. 3,810,874, except that instead of making a dimethacrylate from the diol, a diacrylate was made.

Preparation of the Coating Composition.

Substrates were coated with polymerizable compositions using materials and amounts by weight as reported in the following examples (100% solids unless specified). The commercially available hardcoat compositions listed in Table 2 were used in the coating compositions as described below.

TABLE 2

Hardcoat compositions

| Hardcoat | Name | Description |
|---|---|---|
| HC-1 | SR 306, available from Sartomer Company, Exton, PA. | Tripropyleneglycol diacrylate |
| HC-2 | SR 454, available from Sartomer Company, Exton, PA. | Trimethylolpropane ethoxylated (3) triacrylate |
| HC-3 | SR 492, available from Sartomer Company, Exton, PA. | Trimethylolpropane propoxylated (3) triacrylate |
| HC-4 | BHEDA, available from Sartomer Company, Exton, PA, under the trade designation "SR 349" | Bis-phenol A ethoxylated diacrylate |
| HC-5 | CN 965A80, available from Sartomer Company, Exton, PA. | Urethane acylate blended with Tripropyleneglycol diacrylate |
| HC-6 | CN 984, available from Sartomer Company, Exton, PA. | Urethane acrylate |

Contact Angle Test

The coatings were rinsed for 1 minute by hand agitation in IPA before being subjected to measurement of water and hexadecane contact angles. Measurements were made using as-received reagent-grade hexadecane (Aldrich) and deionized water filtered through a filtration system obtained from Millipore Corporation (Billerica, Mass.), on a video contact angle analyzer available as product number VCA-2500XE from AST Products (Billerica, Mass.). Reported values are the averages of measurements on at least three drops measured on the right and the left sides of the drops, and are shown in Table 2. Drop volumes were 1 µL for receding contact angle.

Marker Resistance Test

The tip of a SANFORD® KING SIZE permanent black marker was cut with a razor blade at an angle to allow for a wide marking width. Using a ruler, a straight line was drawn on the test sample using the marking at a speed of approximately 6 inches per second. The marked sample was then placed next to a 1-5 rating standard with 1 being the lightest and 5 being the darkest. The process was repeated three times and the average of the three tests was taken.

Example 1

0.1 g of FC-1, 9.9 g of HC-1, and 0.1 g of DAROCUR 1173 photoinitiator were added to a vial and shaken for 5 minutes before coating. A piece of vinyl substrate (4"×6") was coated with the above acrylate mixture using a Meyer Bar (#10) to give a 1 mil thickness. The acrylate mixture was then polymerized using a PRC UV processor (Model #84-502) at a line speed of 13 ft/min. The coating layer cured to provide a shiny, smooth hardcoat on the vinyl substrate. The coated vinyl had a receding $C_{16}H_{34}$ contact angle at 60 degrees.

Examples 2-13

The coating compositions listed in Table 3 below, containing one of each of the fluorochemical compounds FC-1 and FC-2 in combination with one of each of the hardcoat compositions HC-1, HC-2, HC-3, HC-4, HC-5 and HC-6, were prepared as follows. 0.025 g of fluorinated polyether acylate (either FC-1 or FC-2), 9.975 g of the hardcoat composition (either HC-1, HC-2, HC-3, HC-4, HC-5, HC-6), and 0.1 g of DAROCUR 1173 photoinitiator were added to a vial and shaken on a for 5 minutes before coating. Each of the compositions was then hand coated onto a white vinyl substrate (4"×6") using a rubber glove to give a thin layer of the coating composition, which was then photopolymerized as described above in example 1. Each of the samples of coated substrate were then exposed to a fluorescent light. The samples were then tested with the Marker Resistance test described above, after 1, 5, 13 and 27 days exposure to the fluorescent light. The results are summarized in Table 4, below.

TABLE 3

Coating formulations E2-E13

| Sample | Fluorochemical Component | Non-Fluorine-Containing Acylate Monomer |
|---|---|---|
| E2 | FC-1 | HC-1 |
| E3 | FC-2 | HC-1 |
| E4 | FC-1 | HC-2 |
| E5 | FC-2 | HC-2 |
| E6 | FC-1 | HC-3 |
| E7 | FC-2 | HC-3 |
| E8 | FC-1 | HC-4 |
| E9 | FC-2 | HC-4 |
| E10 | FC-1 | HC-5 |
| E11 | FC-2 | HC-5 |
| E12 | FC-1 | HC-6 |
| E13 | FC-2 | HC-6 |

TABLE 4

Performance of samples E2-E13 on Black Marker Test after 1, 5, 13, and 27 days.

| Sample | Day 1 | Day 5 | Day 13 | Day 27 |
|---|---|---|---|---|
| E2 | 1 | 1 | 1 | 1 |
| E3 | 1 | 1 | 1 | 1 |
| E4 | 1 | 1 | 1 | 1 |
| E5 | 1 | 1 | 1 | 1 |
| E6 | 1 | 1 | 1 | 1 |
| E7 | 1 | 1 | 1 | 1 |
| E8 | 3 | 5 | 5 | 5 |
| E9 | 1 | 4 | 4 | 4 |
| E10 | 5 | 5 | 5 | 5 |
| E11 | 5 | 5 | 5 | 5 |
| E12 | 5 | 5 | 5 | 5 |
| E13 | 5 | 5 | 5 | 5 |

The above data indicate that the urethane-acylates HC-5 and HC-6 (E10-E13) did not perform as well on the Marker Resistance Test as the non-urethane-containing acylates HC-1, HC-2, HC-3, and HC-4 (E2-E9). The aliphatic acylates HC-1, HC-2, and HC-3 (E2-E7) generally performed better than the aromatic acylate HC-4 (E8-E9). It was also observed that fluorochemical coatings derived from aliphatic non-urethane hardcoat compositions gave much better performance stabilities to ambient fluorescent light regardless of which fluorochemicals were used, whereas the aromatic non-urethane hardcoat composition performed better with some fluorochemicals than with others.

Examples 14-21

The compositions listed in Table 5 were prepared and coated onto a vinyl substrate using the same procedures described above for examples 2-19, except that a mixture of HC-3 (non-urethane acrylate) and HC-6 (urethane acrylate) were used at the following weight ratios: 100/0, 90/10, 80/20, 70/30, 60/40, 50/50, 25/75, and 0/100. FC-1 was used as the fluorochemical component. The samples were tested with the Marker Resistance test described above, after 1, 8, 13 and 22 days exposure to the fluorescent light. The results are summarized in Table 6, below.

TABLE 5

Coating formulations E14-E21

| Sample | Weight Ratio HC-3/HC-7 |
|---|---|
| E14 | 100/0 |
| E15 | 90/10 |
| E16 | 80/20 |
| E17 | 70/30 |
| E18 | 60/40 |
| E19 | 50/50 |
| E20 | 25/75 |
| E21 | 0/100 |

TABLE 6

Performance of samples E14-E21 on Black Marker Test after 1, 8, 13, and 22 days.

| Sample | Day 1 | Day 8 | Day 13 | Day 22 |
|---|---|---|---|---|
| E14 | 1 | 1 | 1 | 1 |
| E15 | 1 | 1 | 1 | 1 |
| E16 | 1 | 1 | 1 | 1 |
| E17 | 1 | 1 | 1 | 2 |
| E18 | 1 | 2 | 2 | 2 |
| E19 | 1 | 4 | 5 | 5 |
| E20 | 4 | 5 | 5 | 5 |
| E21 | 5 | 5 | 5 | 5 |

The above data show that the stain resistance of the compositions, as measured by the Marker Resistance Test, decreases as more of the urethane-containing acrylate HC-7 is added to the composition. Thus, in topcoat systems involving the copolymerization of an acrylic resin with a fluorinated monomer, such as a fluorinated (meth)acrylate compound, the particular non-fluorochemical (meth)acylates used can have a significant impact on the stain-resistance characteristics of the topcoat composition. The data presented herein show that compositions which contain an aliphatic or aromatic non-urethane-containing acrylate as the non-fluorochemical (meth)acrylate monomer component generally exhibit better stain resistance than compositions containing a urethane (meth)acrylate as the non-fluorochemical component of the composition.

Examples 22-23

The formulations show in Table 8 were prepared and coated onto a vinyl substrate using the procedures described above. About 1 wt-% of photoinitiator was added to each of the formulations.

TABLE 8

Coating formulations E22-23

| Sample | wt-% acrylate monomer | Wt-% HFPO monomer |
|---|---|---|
| E22 | 99% HC-6 (SR984) | 1% |
| E23 | 99% HC-1 (SR306) | 1% |

Once Applied to the Substrate and Polymerized, the Samples were Passed Under a UV light (H bulb) 1, 5, 10, and 15 times and the Black Marker Test was performed in order to test the effect of increasing amounts of light exposure on the stain resistant properties of the coating compositions. Three contact angle measurements were also taken after the final pass under the UV light. The results are shown below in Tables 9 and 10

TABLE 9

Black Marker Resistant and Contact Angle (hexadecane) measurements for E22

| Number of passes under UV light | Black Marker Test Score | Receding left contact angel | Receding right contact angle |
|---|---|---|---|
| 1 | 2 | — | — |
| 5 | 3 | — | — |
| 10 | 4 | — | — |
| 15 | 3-4 | 38.0 | 32.2 |
|  |  | 45.0 | 47.0 |
|  |  | 43.3 | 45.1 |

TABLE 10

Black Marker Resistant and Contact Angle (hexadecane) measurements for E23

| Number of passes under UV light | Black Marker Test Score | Receding left contact angel | Receding right contact angle |
|---|---|---|---|
| 1 | 1 | — | — |
| 5 | 1 | — | — |
| 10 | 1 | — | — |
| 15 | 1 | 49.0 | 51.0 |
|  |  | 44.5 | 45.6 |
|  |  | 50.1 | 51.0 |

The above results show that the stain resistance of the urethane acrylate-containing composition HC-6 (E22) degraded after repeated exposure to UV light, while the stain resistance of the non-urethane acrylate composition HC-1 (E23) remained relatively constant.

Various modifications and alterations to this invention will be apparent to those skilled in the art without departing from the spirit and scope of the invention. It should be understood that this invention is not intended to be unduly limited by the illustrative embodiments set forth herein and that such embodiments are presented by way of example only with the scope of the invention intended to be limited only by the claims which follow.

The complete disclosures of the patents, patent documents, and publications cited herein are hereby incorporated by reference in their entirety as if each were individually incorporated.

What is claimed is:

1. A coating composition comprising at least one non-perfluorinated non-urethane aliphatic (meth)acryl compound that is a monomer or oligomer having at least two acryl or methacryl groups, and at least one polymerizable fluorochemical comprising a (per)fluoropolyether (meth)acryl compound, wherein the (per)fluoropolyether (meth)acryl compound comprises at least two catenated oxygen heteroatoms.

2. The coating composition of claim 1, wherein the polymerizable fluorochemical is selected from the group consisting of (per)fluoroether-containing acrylates and methacrylates.

3. The coating composition of claim 1, further comprising a photoinitiator.

4. A coating composition comprising at least one non-perfluorinated non-urethane (meth)acryl compound that is a monomer or oligomer having at least two acryl or methacryl groups, and at least one monoterminated (per)fluoropolyether (meth)acryl compound, wherein the perfluoropolyether of the monoterminated (per)fluoropolyether (meth)acryl compound comprises at least two catenated oxygen heteroatoms.

5. The coating composition of claim 4, wherein the non-urethane acryl compound is selected from the group consisting of aliphatic (meth)acrylates and aromatic (meth)acrylates.

6. The coating composition of claim 4, further comprising a photoinitiator.

7. The coating composition of claim 1 or 4, wherein the composition contains less than 50 percent by weight of a urethane-containing (meth)acryl compound.

8. The coating composition of claim 1 or 4, wherein the composition contains less than 40 percent by weight of a urethane-containing (meth)acryl compound.

9. The coating composition of claim 1 or 4, wherein the composition contains less than 30 percent by weight of a urethane-containing (meth)acryl compound.

10. The coating composition of claim 1 or 4, wherein the composition contains less than 20 percent by weight of a urethane-containing (meth)acryl compound.

11. The coating composition of claim 1 or 4, wherein the composition contains less than 10 percent by weight of a urethane-containing (meth)acryl compound.

12. The coating composition of claim 1 or 4, wherein the composition, is substantially free of urethane (meth)acrylate.

13. The coating composition of claim 1 or 4, where the composition is photopolymerizable.

14. The coating composition of claims 1 or 4 wherein the at least one polymerizable fluorochemical comprises less than 0.5% by weight of the coating composition.

15. The coating composition of claims 1 or 4 wherein the at least one non-perfluorinated non-urethane aliphatic (meth) acryl compound is selected from the group consisting of: a tripropyleneglycol diacrylate, a trimethylolpropane ethoxylated (3) triacrylate, a trimethylolpropane propoxylated (3) triacrylate, and a bis-phenol A ethoxylated diacrylate.

* * * * *